United States Patent
Amir et al.

(10) Patent No.: US 8,838,753 B1
(45) Date of Patent: Sep. 16, 2014

(54) METHOD FOR DYNAMICALLY CONFIGURING NETWORK SERVICES

(75) Inventors: Elan Amir, San Francisco, CA (US); Paul White, Pleasanton, CA (US)

(73) Assignee: Bivio Networks, Inc., Pleasanton, CA (US)

( * ) Notice: Subject to any disclaimer, the term of this patent is extended or adjusted under 35 U.S.C. 154(b) by 0 days.

(21) Appl. No.: 13/527,533

(22) Filed: Jun. 19, 2012
(Under 37 CFR 1.47)

Related U.S. Application Data

(63) Continuation of application No. 13/032,552, filed on Feb. 22, 2011, now Pat. No. 8,204,994, which is a continuation of application No. 11/837,095, filed on Aug. 10, 2007, now Pat. No. 7,895,331.

(60) Provisional application No. 60/822,012, filed on Aug. 10, 2006.

(51) Int. Cl.
   *G06F 15/177* (2006.01)

(52) U.S. Cl.
   USPC ........... 709/220; 709/223; 709/226; 709/238; 709/250; 718/104; 718/105; 370/235; 370/392; 370/395.3

(58) Field of Classification Search
   CPC ... H04L 47/10; H04L 47/2441; H04L 47/125; H04L 49/30; H04L 2012/562; H04L 45/54; H04L 47/2408; H04L 2012/5678; H04L 47/2433; H04L 69/22
   USPC ......... 709/223, 224, 226, 238, 250, 220, 221; 718/104, 105; 370/235, 392, 395.3
   See application file for complete search history.

(56) References Cited

U.S. PATENT DOCUMENTS

| | | | |
|---|---|---|---|
| 5,287,531 A | 2/1994 | Rogers, Jr. et al. | |
| 5,506,969 A | 4/1996 | Wall et al. | |
| 6,041,347 A | 3/2000 | Harsham et al. | |
| 6,321,181 B1 | 11/2001 | Havens | |
| 6,735,179 B2 | 5/2004 | Teplitsky | |
| 6,845,456 B1 | 1/2005 | Menezes et al. | |
| 7,111,072 B1 | 9/2006 | Matthews et al. | |
| 7,254,639 B1 * | 8/2007 | Siegel et al. | 709/238 |
| 7,369,557 B1 | 5/2008 | Sinha | |
| 7,395,538 B1 | 7/2008 | Carney et al. | |
| 7,543,052 B1 | 6/2009 | Cesa Klein | |
| 7,554,909 B2 * | 6/2009 | Raghunath et al. | 370/230 |
| 7,895,331 B1 * | 2/2011 | Amir et al. | 709/226 |

(Continued)

OTHER PUBLICATIONS

U.S. Appl. No. 09/679,321, filed Oct. 3, 2000, Islam et al.

(Continued)

*Primary Examiner* — Oanh Duong
(74) *Attorney, Agent, or Firm* — Pillsbury Winthrop Shaw Pittman LLP

(57) ABSTRACT

A method for providing network services includes the ability to dynamically and flexibly configure resources in a network server platform to service classes and sets of network traffic. According to one aspect, a programmable network server platform can be configured to bind multiple traffic classes in a mixture of inline and tap modes to a group of CPUs. Traffic having the associated classes can be configured to pass directly through while sending a copy down to one or more CPUs, as well as load balanced to a group or sub group of CPUs. According to another aspect, different applications or configurations can be run on different groups or sub groups of CPUs allowing complete flexibility.

20 Claims, 6 Drawing Sheets

(56) References Cited

U.S. PATENT DOCUMENTS

| | | | |
|---|---|---|---|
| 7,936,770 B1 * | 5/2011 | Frattura et al. | 370/412 |
| 8,005,101 B1 | 8/2011 | Kleyman | |
| 2001/0053148 A1 | 12/2001 | Bilic et al. | |
| 2001/0053150 A1 * | 12/2001 | Clear et al. | 370/392 |
| 2002/0039349 A1 | 4/2002 | Malaney et al. | |
| 2002/0055998 A1 * | 5/2002 | Riddle et al. | 709/224 |
| 2002/0097736 A1 | 7/2002 | Cohen | |
| 2002/0143939 A1 * | 10/2002 | Riddle et al. | 709/224 |
| 2002/0184381 A1 | 12/2002 | Ryan et al. | |
| 2003/0035430 A1 | 2/2003 | Islam et al. | |
| 2003/0131075 A1 | 7/2003 | Bear et al. | |
| 2003/0143973 A1 | 7/2003 | Nagy et al. | |
| 2003/0210686 A1 | 11/2003 | Terrell et al. | |
| 2004/0213155 A1 | 10/2004 | Xu et al. | |
| 2004/0260951 A1 * | 12/2004 | Madour | 713/201 |
| 2005/0086657 A1 * | 4/2005 | Jason et al. | 718/102 |
| 2005/0188070 A1 * | 8/2005 | Tripathi et al. | 709/223 |
| 2005/0265308 A1 * | 12/2005 | Barbir et al. | 370/351 |
| 2007/0033315 A1 | 2/2007 | Nguyen et al. | |
| 2007/0058632 A1 | 3/2007 | Back et al. | |
| 2007/0208854 A1 * | 9/2007 | Wiryaman et al. | 709/225 |
| 2008/0195731 A1 * | 8/2008 | Harmel et al. | 709/224 |

OTHER PUBLICATIONS

U.S. Appl. No. 09/918,363, filed Jul. 30, 2001, Islam et al.
U.S. Appl. No. 11/837,089, filed Aug. 10, 2009, Kleyman et al.

* cited by examiner

METHOD FOR DYNAMICALLY CONFIGURING NETWORK SERVICES

CROSS-REFERENCE TO RELATED APPLICATIONS

The present application is a continuation of U.S. application Ser. No. 13/032,552 filed Feb. 22, 2011, now U.S. Pat. No. 8,204,994, which is a continuation of U.S. application Ser. No. 11/837,095 filed Aug. 10, 2007, now U.S. Pat. No. 7,895,331, which claims the benefit of U.S. Provisional Application No. 60/822,012, filed Aug. 10, 2006. The contents of all such applications are incorporated herein by reference in their entireties.

FIELD OF THE INVENTION

The present invention relates to providing network services, and in particular to a method for dynamically configuring resources in a programmable network server platform to service classes and sets of network traffic.

BACKGROUND OF THE INVENTION

Performance and flexibility have historically been viewed as opposing goals in network system design. The emergence of Packet Handling software in networking has pushed the struggle to achieve both performance and flexibility in the same system to the forefront of the requirements of next-generation networking. The fundamental building blocks of network application designs are Packet Processing and Control. Conventional ASIC-based designs combine Packet Processing and Control into custom hardware, achieving performance at the expense of flexibility, development cost and complexity. At the other end of the conventional design spectrum lie "server"-based approaches, which place Packet Processing and Control on general purpose processors, thereby retaining flexibility at the expense of performance.

Application Ser. Nos. 09/679,321 and 09/918,363, incorporated by reference herein, advanced the state of the art by providing a Programmable Network Server and Device. An aspect of these applications is that they provided a platform for performing Packet Processing and Control applications that is dynamically and remotely loadable such that new network service applications can be written and deployed on servers without deploying network personnel to the server location and without interrupting or re-routing traffic that would otherwise pass through the device.

The present application aims at extending and leveraging certain of the capabilities of the co-pending applications in new and useful ways.

SUMMARY OF THE INVENTION

The present invention relates to providing network services, and in particular to a method for dynamically and flexibly configuring resources in a network server platform to service classes and sets of network traffic. According to one aspect, a programmable network server platform can be configured to bind multiple traffic classes in a mixture of inline and tap modes to a group of CPUs. Traffic having the associated classes can be configured to pass directly through while sending a copy down to one or more CPUs, as well as load balanced to a group or sub group of CPUs. According to another aspect, different applications or configurations can be run on different groups or sub groups of CPUs allowing complete flexibility. According to a further aspect, the number of CPUs in the system is dynamically scalable and the configurations can be readily adjusted to take advantage of the current processing resources in the system.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention relates to a method that allows the servicing and handling of network traffic to be dynamically and flexibly defined and configured. In one example, Configurable Inspection Groups (CIGs) allow a programmable network server platform to be configured so as to bind traffic classes in a mixture of inline and tap modes to a group of one or more CPUs. Traffic having the associated classes can be configured to pass directly through while sending a copy down to one or more CPUs, as well as load balanced to a group or sub group of CPUs. Different applications or configurations can be run on different groups or sub groups of CPUs allowing complete flexibility.

Figure 1:
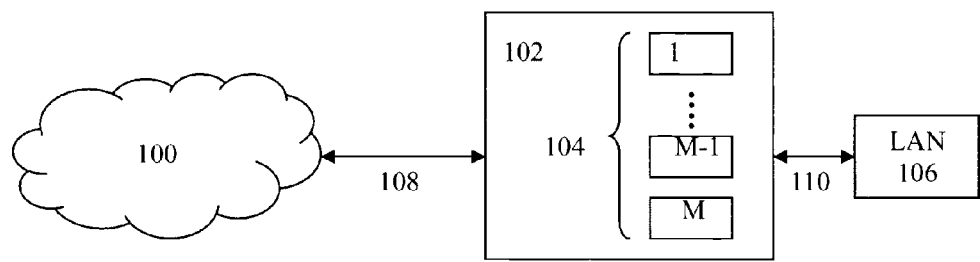
FIG. 1 is a block diagram illustrating an example network environment in which the present invention is implemented.

FIG. 1 illustrates an example implementation of the present invention. As shown in FIG. 1, some embodiments of the invention include a Programmable Network Device 102, which may be located at any point within a network or between networks. Device 102 includes functionality for implementing the dynamic configuration aspects of the invention as described generally and without limitation above, and as will be described in more detail below. In some embodiments, the device may be located at a customer, or enterprise premises; in other embodiments, the device may be located at an edge of a service provider network 100. In some embodiments, the Programmable Network Device 102 may be owned and/or operated by a Service Provider (SP) or carrier connecting the customer, or enterprise, to a Wide Area Network (WAN). The WAN may be an Autonomous System, service provider backbone, or other type of internetwork. Alternatively, the device may be owned and/or operated by the enterprise itself.

In some embodiments of the invention, device 102 may be a self-contained unit which resides behind an access router (not shown) and supports IP services to the enterprise. In alternative embodiments, device 102 may be instantiated as, or together with, an access router. In other alternatives, device 102 may be implemented by a plurality of rack components and/or a plurality of components (i.e. racks, chassis, boxes, etc.) connected together in a single physical location and/or distributed in different physical locations and networked together. In embodiments of the invention, device 102 may include two or more physical interfaces 108 110 for carrying data; in embodiments, these interfaces may operate at rates of 1 Gbps or higher. In some such embodiments, the physical interfaces 108 110 may comprise Gigabit Ethernet interfaces; in other embodiments, one or more of the physical interfaces may comprise 10/100 Ethernet interfaces. Interfaces 108 110 may connect to an access router, directly to an enterprise network 100, to LAN/WAN 106, individual endpoints, other networks, and/or combinations thereof. In embodiments of the invention, the device 102 may include additional interfaces for management, which may include, but are not limited to a console or modem to a serial port, or a 10/100 Ethernet port.

In embodiments such as that shown in FIG. 1, device 102 includes a plurality of M processors. An example implementation of device 102 in which the number of processor can be scaled depending on the needs of a given application is described in U.S. Pat. No. 8,005,101, the contents of which are incorporated herein by reference.

Figure 2:
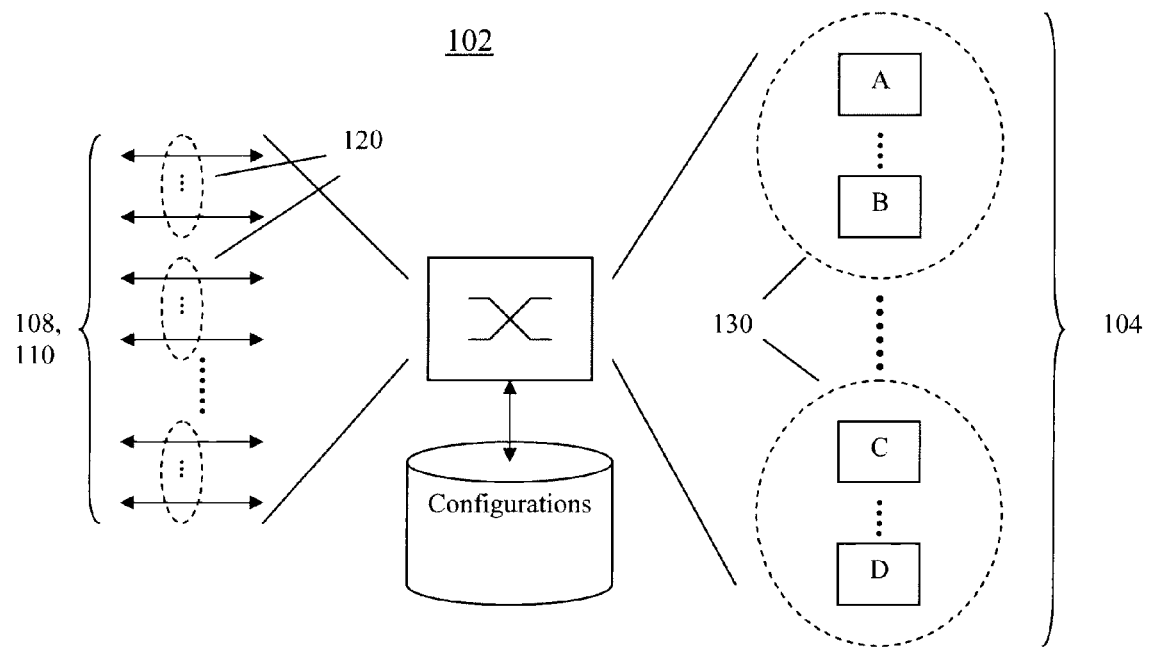
FIG. 2 is a functional block diagram of a programmable network device that can be used to implement the present invention.

FIG. 2 illustrates certain general aspects of the invention according to the implementation illustrated in FIG. 1. As shown in FIG. 2, the present invention allows groups, sets and/or types of traffic 120 on the interfaces 108 110 to be dynamically configured and classified according to any number and/or combination of attributes such as physical interface (e.g. port, slot), network protocol (e.g. IP, ARP), interface type (e.g. Ethernet), Layers 4 through 7 information (e.g. context-dependent, application-level, etc.), any arbitrary header content and/or payload content, user, session, state, environmental conditions, third party information, and any other type of deep-packet processing information. Additionally or alternatively, the invention allows individual CPUs 104 to be dynamically assigned by reference to logical CPU groups 130, thereby providing additional flexibility and performance. Moreover, stored configurations can further specify actions regarding how these logically identified different groups 120 of traffic are handled, distributed to and/or processed by the logical CPU groups 130. For example, the invention allows an administrator to identify a set of CPUs as a CIG, and to configure traffic sets and traffic classes such that a number of interfaces (such as those corresponding to a group of employees and/or resources within a company such as a Lab), and traffic classes on those interfaces (e.g. IP traffic) are serviced by the CPUs specified in the CIG.

It should be noted that, to the extent not otherwise apparent from FIG. 2, groups 120 and 130 can contain just one type of traffic or CPU, respectively, or any arbitrary number, and the numbers in each group can be different from the other groups. Moreover, groups are not necessarily mutually exclusive. For example, traffic having a certain attribute can belong to several groups, and CPUs can belong to several groups.

Figure 3:
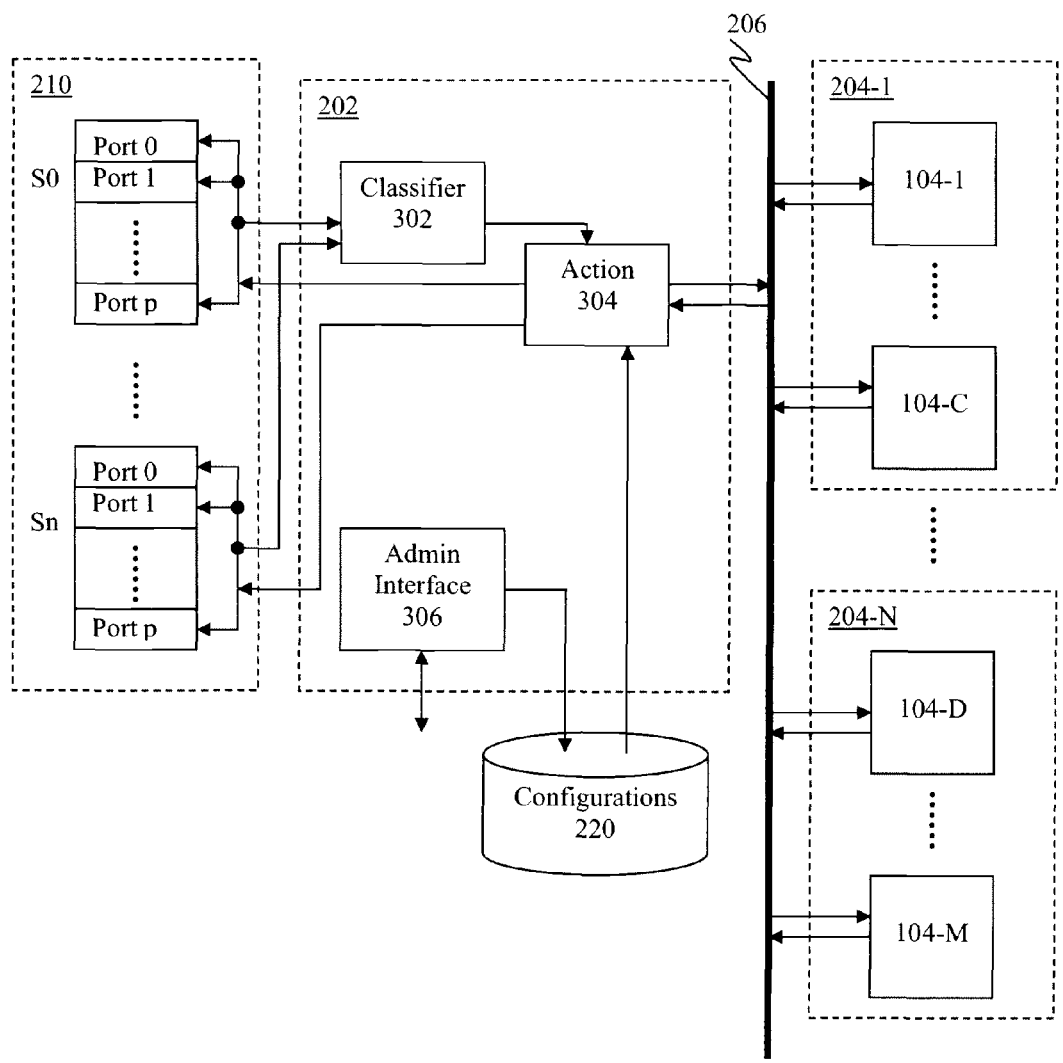
FIG. 3 is a block diagram illustrating certain components of a device implementing certain features of the invention in more detail.

An example platform 102 is shown in more detail in FIG. 3. As shown in FIG. 3, platform 102 includes a network processing card (NPC) 202 that communicates with an external interface 210, as well as with application processor cards (APCs) 204-1 to 204-N via an internal interface 206.

In general, traffic from and to interfaces 108, 110 enters and exits the platform 102 through network interface 210. Network interface 210 passes line-rate traffic to NPC 202. NPC 202 is responsible for system management functions. According to an aspect of the invention, NPC 202 is capable of managing and distributing traffic from interfaces 210 to individual or multiple CPUs 104 in APCs 204 in accordance with configurations in configurations 220. NPC 202 can distribute traffic through other algorithms or methodologies as well.

CPUs 104 execute third party applications running on the platform 102. Each APC includes one or more CPUs 104 (for example, an MPC7447A PowerPC from Freescale Semiconductor of Austin, Tex. or processors from Intel or Advanced Micro Devices), together with memory and optional acceleration sub-systems for applications such as 3DES, IPSec, SSL, XML and DSP. CPUs 104 can perform functions such as establishing a session, application-level processing tasks, and state or peer synchronization.

In one non-limiting example, internal interface 206 is a 10 Gbps full duplex bus that employs an Ethernet-like protocol to distribute traffic across CPUs.

External interface 210 comprises one or more Network Interface Modules (NIMs) or integrated four- and eight-port modules to implement and/or support interfaces 108 and 110. In one example, NIMs are used to allow a wide variety of network interfaces: 4 port Gigabit Ethernet fiber, 4-port 10/100/1000 Ethernet copper with configurable HW Bypass, or a 4-port 10/100/1000 Ethernet copper with one optional fiber Gigabit port. In another example, network connectivity is achieved via a four- or eight-port interface with 10/100/1000 Ethernet or Fiber Gigabit Ethernet options. Other types and bandwidths of interfaces are possible, such as 10 Gigabit Ethernet, POS, OC-3, OC-48, OC-192, etc. In one example, interface 210 provides two NIM slots and slots can be configured with multiple options. NIMs contain media access control, simple packet buffering, and associated physical layer control.

Further details of an example platform 102 including NPCs and APCs that can use or implement the methodology of the present invention are provided in U.S. Pat. No. 8,005,101.

As set forth above, an aspect of the invention is the ability to configure distribution and servicing of network traffic among CPUs 104 in APs 204 through configurable inspection groups (CIGs) as stored in configurations 220. In one non-limiting example, an inspection group is a collection of one or more CPUs that is pre-allocated to process a specific traffic class using a specific application. Using these inspection groups, it is possible to segment the processor resources in the system in such a way that multiple applications can run simultaneously on separate CPUs within the same base chassis. Each application can then view or process defined traffic classes representing a subset of traffic (or all traffic) and manage it appropriately.

Configurable inspection groups according to the invention can provide powerful flexibility. The one or more processors comprising a CIG can be bound to a specific traffic class or classes so as to distribute incoming traffic to the assigned computational resources according to the classification. For example, IP traffic can be classified into two groups which are then load balanced among a dedicated inspection group, or group of CPUs. Different applications or configurations can be run on different inspection groups, allowing complete flexibility in applying the platforms resources to different tasks.

Returning to FIG. 3, external interface 210 in this example implementation is comprised of a plurality of physical interfaces that are configured as individual ports Port 0 to Port p grouped in one or more slots S0 to Sn. It should be noted that this is just one possible example configuration, and that there need not be slots and/or the number of ports in the slots can be different. In one example implementation, the physical interfaces are Ethernet, however other types of interfaces are possible such as SONET, ATM, OC-X, T1, T3, E1, E3, DSL, 802.11, 802.16, etc.

As further shown in the example of FIG. 3, there are a plurality of processors 104-1 to 104-M in the system, which are provided in one or more APCs 204. The number of CPUs in each APC 204 may be the same, or they may be different. APCs 204 further include program memory, operating systems and other components necessary for running network service and other applications on CPUs 104. An aspect of the invention is that the number of CPUs 104 can be easily scaled in accordance with the processing resources needed for a particular implementation, for example by adding and removing APCs in device 102. Although not shown in FIG. 3, there is preferably also a processor in NPC 202 which is a control processor—in some embodiments this is called CPU-X.

In the example of FIG. 3, NPC 202 includes a classifier 302. According to example aspects of the invention, classifier 302 provides identification information of traffic from interfaces in 210 so that they can be handled according to traffic sets and traffic classes, which are defined in configurations 220. Those skilled in the art of network devices will be able to understand how to implement a classifier 302 using hardware and/or software after being taught by the present and co-pending application, including the details below.

In one example of the invention, traffic sets indicate how various types of traffic will be handled, the attributes associated with each inspection group, and the action to be taken on traffic within each group. Classifier 302 identifies the interface on which incoming packets arrive (e.g. Slot and Port numbers). Traffic classes are used to determine what action is taken when traffic belonging to that traffic class is received. If packets match multiple traffic classes, the highest priority (top of the list) match can be evaluated first. Classifier 302 further identifies the type of traffic associated with incoming packets (e.g. IPv6, ARP, etc.).

NPC 202 in this example implementation further includes action module 304. Action module 304 performs actions on packets based on the traffic identification information provided by classifier 302 and in accordance with configurations in configurations 220. Actions can include forwarding a particular class and/or set of traffic to a particular CPU or group of CPUs. Actions can also include, for example, load balancing traffic among multiple CPUs, copying and/or broadcasting traffic, directly passing traffic through device 102 without processing by any CPUs, tapping traffic (where packets are directly passed between two interfaces while copies are sent to one or more CPUs), in addition to other actions such as blocking, rate-limiting, shaping, QOS, policing, etc.

Those skilled in the art will understand how to implement functionality for actions performed by module 304 such as load balancing, copying, broadcasting, passing through and/or tapping traffic according to rules established in configurations 220 as will be described in more detail below, and after being taught by the present disclosure, as well as the incorporated contents of the co-pending applications.

Administrator interface 306 allows administrators to define CIGs so as to configure platform 102 to define traffic classes and associate them with a further defined group of CPUs, together with some defined action. For example, in a tap mode, traffic matching the associated traffic classes can be configured to pass directly through the platform with minimal latency while sending a copy of the packet to the appropriate inspection group(s). Through the configurations provided by an administrator and saved in configurations 220, different applications can be configured to run on different groups or sub groups of CPUs, and these applications can be configured to handle different classes or sets of network traffic, thereby allowing complete flexibility in how processor resources in the platform are used. With built-in hardware broadcast and multicast capability, packets can be duplicated in hardware for transmission to multiple CPUs without penalty to system throughput or packet latency.

In one example implementation, CIGs and other configurations needed for configurations 220 are defined by XML files. These XML files are parsed by NPC 202 and the parsed files are stored in configurations 220 for real-time access by NPC 202 during processing. Those skilled in the art will understand how to implement the specification and parsing of configurations using XML files and associated DTDs according to well-known techniques, and after being taught by the examples provided herein. It should be noted that administrator interface 306 can also include a command-line interface and/or GUI to input or edit configurations directly or indirectly through XML files, for example using any conventional text editor or word processing program or equivalent functionality in any other program, and various design details of such user interfaces will become apparent to those skilled in the art after being taught by the present disclosure.

It should be further noted that modules 302-306 can be implemented by software running on a CPU (e.g. a MPC7447A PowerPC from Freescale Semiconductor of Austin, Tex., an Intel processor, or an Advanced Micro Devices processor, etc) and/or a network processor (e.g. an Intel IXP chip, a Motorola C-Port processor, an Agere chip or an RMI XLR732, etc.) under an environment such as Linux. Alternatively, one or more modules 302-306 can be fully or partially implemented by dedicated processors, systems on a chip, or ASICs. Still further, NPC 202 can include additional or alternative functionality than that described in connection with modules 302-306, such as NAT, Diffsery and Intsery traffic management, SCSI and RAID support, chassis-level management, and traffic metering an statistics, but details thereof are omitted here for clarity of the invention.

The configuration capabilities of the present invention will now be described in more detail in connection with several non-limiting examples. TABLE 1 below depicts an example configuration of traffic sets, in which groups of physical interfaces are defined and identified with logical names. In the below example, a traffic set named "Lab" is defined as comprising the physical interfaces Slot 0/Port 1 and Slot 1/Port 0. Other traffic sets named "Mfg" and "Default" are also defined. The below example shows how different traffic classes can be associated with a traffic set. As shown, the "Lab" interfaces are defined as including traffic classes named "Lab-IP," "Lab-Errors" and "Lab-Others".

TABLE 1

| Traffic Sets | | |
|---|---|---|
| Name | Interfaces | Traffic Classes |
| lab | s0.e0, s1.e0 | lab-ip, lab-errors, lab-other |
| mfg | s0.e2, s0.e3 | mfg-ip, mfg-arp, mfg-IPv6, mfg-other |
| default | s0.e1, s1.e1, s1.e2, s1.e3 | default-drop |

TABLE 2 below illustrates an example configuration of traffic classes, as well as actions to be applied to these traffic classes. In the below example, a traffic class named "Lab-IP" is defined as comprising all IP packets arriving on the interfaces associated with that class (for example, the physical interfaces defined by "lab" in the table above). The below example also shows how actions to be taken with these packets can be defined. In this example, packets associated with "Lab-IP" traffic are to be passed through in addition to being distributed in a load-balanced fashion to CPUs defined by the groups named "Lab-IG1" and "Lab-IG2". Other traffic classes and associated actions are also defined.

TABLE 2

| Traffic Classes | | |
|---|---|---|
| Name | Classifications | Actions |
| lab-ip | IP_ALL_PACKETS | pass-thru, load-balance to lab-ig1, load-balance to lab-ig2 |
| lab-errors | ERR_ALL_PACKETS | drop |
| lab-other | ALL_PACKETS | pass-thru |
| mfg-ip | IP_ALL_PACKETS | broadcast to mfg-ig |
| mfg-arp | ETH_ARP_PACKETS | pass-thru |
| mfg-IPv6 | IPV6_ALL_PACKETS | pass-thru |
| mfg-other | ALL_PACKETS | drop |
| default-drop | ALL_PACKETS | drop |

FIGS. 4 through 12 provide examples that illuminate various configuration features of the invention in more detail.

Figure 4:
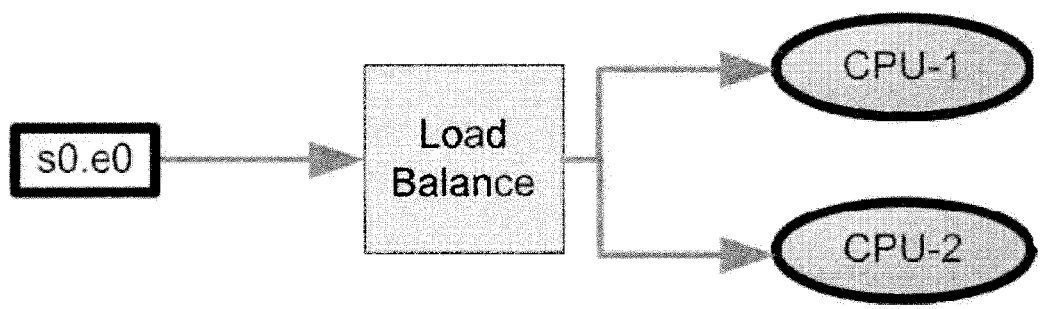
FIGS. 4 through 12 are block diagrams illustrating example configurations of interfaces and CPUs in accordance with various aspects of the invention.

FIG. 4 illustrates an example of how device 102 can be configured to perform Simple Load Balancing of certain traffic. In this example, IP packets coming in through physical interface s0.e0 are load balanced to CPU-1 and CPU-2, while Ethernet ARP packets and IPv6 packets are passed through without processing and all other types of packets are dropped. Based on the XML configuration below, an application configured to run on the CPU list red-ig would run on both CPU-1 and CPU-2, and would process the IP packets. Below is an XML configuration file that can be used by device 102 to implement the example in FIG. 4 and described above:

```
<?xml version="1.0"?>
<CIG:Configuration desc="Example #1: Simple Load Balancing">
<!--Interface Configuration-->
<CIG:InterfaceConfig>
<CIG:Interface name="s0.e0" type="transparent"/>
</CIG:InterfaceConfig>
<!--Inspection Groups (CPUS)-->
<!--red net inspection group-->
<CIG:InspectionGroup name="red-ig">
<CIG:Cpus from="apc">2</CIG:Cpus>
</CIG:InspectionGroup>
<!--Traffic Sets—describes how to handle traffic-->
<!--Traffic Set for red net interfaces-->
<CIG:TrafficSet name="red">
<CIG:Input>
<!--Interface(s) assigned to this Set-->
<CIG:Interface>s0.e0</CIG:Interface>
</CIG:Input>
<!--IP traffic class-->
<CIG:TrafficClass name="red-ip">
<CIG:Classification>IP_ALL_PACKETS</CIG:Classification>
<!--Actions to be applied-->
<CIG:Action type="load-balance">red-ig</CIG:Action>
</CIG:TrafficClass>
<!--ARP traffic class-->
<CIG:TrafficClass name="red-arp">
<CIG:Classification>ETH_ARP_PACKETS</CIG:Classification>
<!--Actions to be applied-->
<CIG:Action type="pass-thru"/>
</CIG:TrafficClass>
<!--IPv6 traffic class-->
<CIG:TrafficClass name="red-IPv6">
<CIG:Classification>IPV6_ALL_PACKETS</CIG:Classification>
<!--Actions to be applied-->
<CIG:Action type="pass-thru"/>
</CIG:TrafficClass>
<!--Catch all traffic class-->
<CIG:TrafficClass name="red-other">
<CIG:Classification>ALL_PACKETS</CIG:Classification>
<!--Actions to be applied-->
<CIG:Action type="drop"/>
</CIG:TrafficClass>
</CIG:TrafficSet>
</CIG:Configuration>
```

Figure 5:
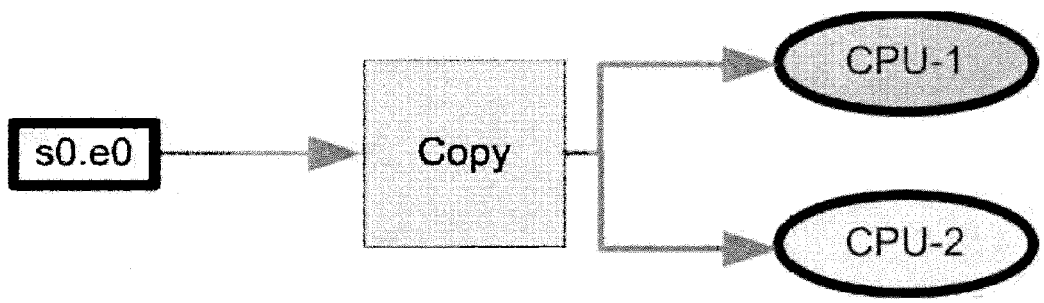

FIG. 5 illustrates an example of how device 102 can be configured to provide Simple Copying so that two or more applications can process the same network traffic. In this example, IP packets coming in on physical interface s0.e0 are copied and sent to both CPU-1 and CPU-2. In this example, different packet processing applications (e.g. monitoring applications) run on CPU-1 and CPU-2. For example, a first monitoring application runs on CPU-1 by using the CPU list name bvcig.dmz-ig1, and a second monitoring application runs on CPU-2 by using the CPU list name bvcig.dmz-ig2. Below is an XML file that can be used by device 102 to implement the example shown in FIG. 5 and described above:

```
<?xml version="1.0"?>
<CIG:Configuration desc="Example #2: Simple Copying">
<!--Interface Configuration-->
<CIG:InterfaceConfig>
<CIG:Interface name="s0.e0" type="transparent"/>
</CIG:InterfaceConfig>
<!--Inspection Groups (CPUS)-->
<!--first dmz net inspection group-->
<CIG:InspectionGroup name="dmz-ig1">
<CIG:Cpus from="apc">1</CIG:Cpus>
</CIG:InspectionGroup>
<!--second dmz net inspection group-->
<CIG:InspectionGroup name="dmz-ig2">
<CIG:Cpus from="apc">1</CIG:Cpus>
</CIG:InspectionGroup>
<!--Traffic Sets—describes how to handle traffic-->
<!--Traffic Set for dmz net interfaces-->
```

```xml
<CIG:TrafficSet name="dmz">
<CIG:Input>
<!--Interface(s) assigned to this Set-->
<CIG:Interface>s0.e0</CIG:Interface>
</CIG:Input>
<!--IP traffic class-->
<CIG:TrafficClass name="dmz-ip">
<CIG:Classification>IP_ALL_PACKETS</CIG:Classification>
<!--Actions to be applied-->
<CIG:Action type="load-balance">dmz-ig1</CIG:Action>
<CIG:Action type="load-balance">dmz-ig2</CIG:Action>
</CIG:TrafficClass>
<!--ARP traffic class-->
<CIG:TrafficClass name="dmz-arp">
<CIG:Classification>ETH_ARP_PACKETS</CIG:Classification>
<!--Actions to be applied-->
<CIG:Action type="pass-thru"/>
</CIG:TrafficClass>
<!--IPv6 traffic class-->
<CIG:TrafficClass name="dmz-IPv6">
<CIG:Classification>IPV6_ALL_PACKETS</CIG:Classification>
<!--Actions to be applied-->
<CIG:Action type="pass-thru"/>
</CIG:TrafficClass>
<!--Catch all traffic class-->
<CIG:TrafficClass name="dmz-other">
<CIG:Classification>ALL_PACKETS</CIG:Classification>
<!--Actions to be applied-->
<CIG:Action type="drop"/>
</CIG:TrafficClass>
</CIG:TrafficSet>
</CIG:Configuration>
```

Figure 6:
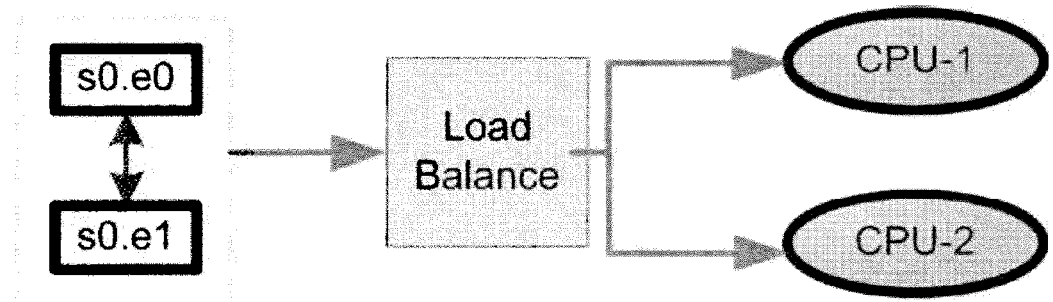

FIG. 6 illustrates an example of how device 102 can be configured to allow for tapping with load balancing of certain network traffic. More particularly, this example illustrates how device 102 can be configured such that packets are passed among and between two different interfaces, and copies of IP packets are load balanced for processing by an application running on two processors, CPU-1 or CPU-2. Below is an XML file that can be used by device 102 to implement this example:

```xml
<?xml version="1.0"?>
<CIG:Configuration desc="Example #3: Tapping with load balancing">
<!--Interface Configuration-->
<CIG:InterfaceConfig>
<CIG:Interface name="s0.e0" type="transparent">s0.e1</CIG:Interface>
<CIG:Interface name="s0.e1" type="transparent">s0.e0</CIG:Interface>
</CIG:InterfaceConfig>
<!--Inspection Groups (CPUS)-->
<!--red net inspection group-->
<CIG:InspectionGroup name="mktg-ig">
<CIG:Cpus from="apc">2</CIG:Cpus>
</CIG:InspectionGroup>
<!--Traffic Sets—describes how to handle traffic-->
<!--Traffic Set for mktg net interfaces-->
<CIG:TrafficSet name="mktg">
<CIG:Input>
<!--Interface(s) assigned to this Set-->
<CIG:Interface>s0.e0</CIG:Interface>
<CIG:Interface>s0.e1</CIG:Interface>
</CIG:Input>
<!--IP traffic class-->
<CIG:TrafficClass name="mktg-ip">
<CIG:Classification>IP_ALL_PACKETS</CIG:Classification>
<!--Actions to be applied-->
<CIG:Action type="pass-thru"/>
<CIG:Action type="load-balance">mktg-ig</CIG:Action>
</CIG:TrafficClass>
<!--Errored packets traffic class-->
<CIG:TrafficClass name="mktg-errors">
<CIG:Classification>ERR_ALL_PACKETS</CIG:Classification>
<!--Actions to be applied-->
<CIG:Action type="drop"/>
</CIG:TrafficClass>
<!--Catch all traffic class-->
<CIG:TrafficClass name="mktg-other">
<CIG:Classification>ALL_PACKETS</CIG:Classification>
<!--Actions to be applied-->
<CIG:Action type="pass-thru"/>
</CIG:TrafficClass>
</CIG:TrafficSet>
</CIG:Configuration>
```

Figure 7:
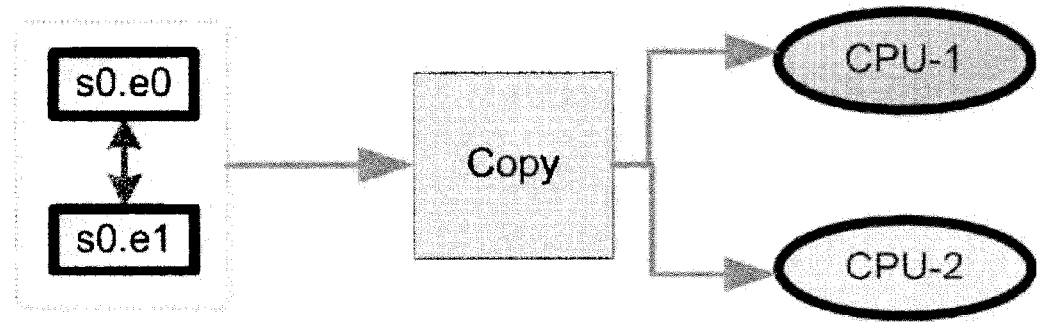

FIG. 7 illustrates an example of how device 102 can be configured to provide tapping with copying of certain network traffic. More particularly, in this example, packets are passed between and among two physical interfaces, while IP packets are copied and sent to two different CPUs for processing by different applications. Below is an XML file that can be used by device 102 to implement this example:

```xml
<CIG:Configuration desc="Example #4: Tapping with Copying">
<!--Interface Configuration-->
<CIG:InterfaceConfig>
<CIG:Interface name="s0.e0" type="transparent">s0.e1</CIG:Interface>
<CIG:Interface name="s0.e1" type="transparent">s0.e0</CIG:Interface>
</CIG:InterfaceConfig>
<!--Inspection Groups (CPUS)-->
<!--first dialup net inspection group-->
<CIG:InspectionGroup name="dialup-ig1">
<CIG:Cpus from="apc">1</CIG:Cpus>
</CIG:InspectionGroup>
<!--second dialup net inspection group-->
<CIG:InspectionGroup name="dialup-ig2">
<CIG:Cpus from="apc">1</CIG:Cpus>
</CIG:InspectionGroup>
<!--Traffic Sets—describes how to handle traffic-->
<!--Traffic Set for dialup net interfaces-->
<CIG:TrafficSet name="dialup">
<CIG:Input>
<!--Interface(s) assigned to this Set-->
<CIG:Interface>s0.e0</CIG:Interface>
<CIG:Interface>s0.e1</CIG:Interface>
</CIG:Input>
<!--IP traffic class-->
<CIG:TrafficClass name="dialup-ip">
<CIG:Classification>IP_ALL_PACKETS</CIG:Classification>
<!--Actions to be applied-->
<CIG:Action type="pass-thru"/>
```

```
<CIG:Action type="load-balance">dialup-ig1</CIG:Action>
<CIG:Action type="load-balance">dialup-ig2</CIG:Action>
</CIG:TrafficClass>
<!--Errored packets traffic class-->
<CIG:TrafficClass name="dialup-errors">
<CIG:Classification>ERR_ALL_PACKETS</CIG:Classification>
<!--Actions to be applied-->
<CIG:Action type="drop"/>
</CIG:TrafficClass>
<!--Catch all traffic class-->
<CIG:TrafficClass name="dialup-other">
<CIG:Classification>ALL_PACKETS</CIG:Classification>
<!--Actions to be applied-->
<CIG:Action type="pass-thru"/>
</CIG:TrafficClass>
</CIG:TrafficSet>
</CIG:Configuration>
```

Figure 8:
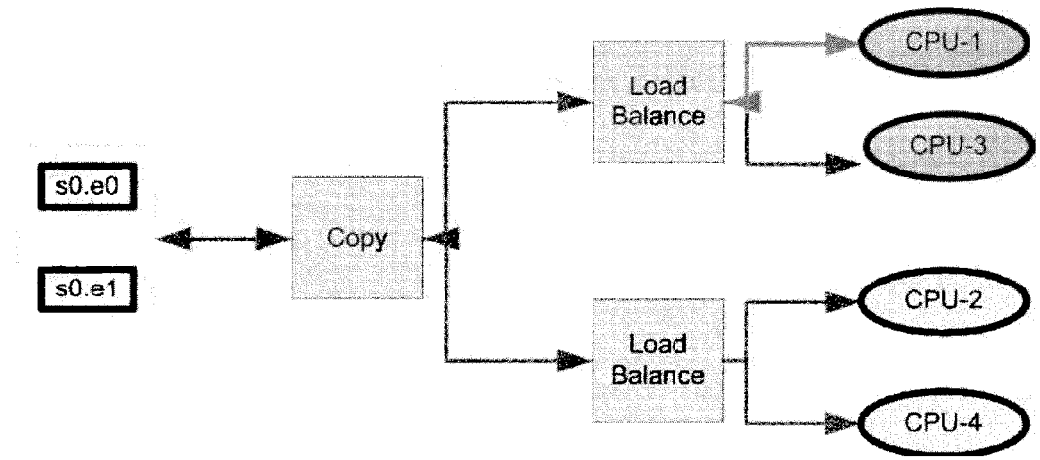

FIG. 8 illustrates an example of how device 102 can be configured to perform copying and load balancing of certain network traffic. More particularly, this example shows how packets coming in from two different physical interfaces are copied to two different sets of CPUs, with each set having two or more CPUs that load share an application. This would allow two different applications to see the packets at the same time, while spanning across multiple CPUs. In this example, the first application, which would run on the group containing CPU-1 and CPU-3, would be configured to run on CPU list bvcig.server-ig1 and could be responsible for forwarding the packets between the two interfaces, while the second application which would run the group containing CPU-2 and CPU-4 would be configured for the CPU list bvcig.server-ig2 and would just tap the packets from both interfaces. Below is an XML file that can be used by device 102 to implement this example.

```
<xml version="1.0"?>
<CIG:Configuration desc="Example #5: Copying and Load Balancing">
    <!--Interface Configuration-->
    <CIG:InterfaceConfig>
        <CIG:Interface name="s0.e0" type="transparent">s0.e1</CIG:Interface>
        <CIG:Interface name="s0.e1" type="transparent">s0.e0</CIG:Interface>
    </CIG:InterfaceConfig>
    <!--Inspection Groups (CPUS)-->
    <!--first server net inspection group-->
    <CIG:InspectionGroup name="server-ig1">
    <CIG:Cpus from="apc">2</CIG:Cpus>
    </CIG:InspectionGroup>
    <!--second server net inspection group-->
    <CIG:InspectionGroup name="server-ig2">
    <CIG:Cpus from="apc">2</CIG:Cpus>
    </CIG:InspectionGroup>
    <!--Traffic Sets—describes how to handle traffic-->
    <!--Traffic Set for server net interfaces-->
    <CIG:TrafficSet name="server">
    <CIG:Input>
    <!--Interface(s) assigned to this Set-->
    <CIG:Interface>s0.e0</CIG:Interface>
    <CIG:Interface>s0.e1</CIG:Interface>
    </CIG:Input>
    <!--IP traffic class-->
    <CIG:TrafficClass name="server-ip">
    <CIG:Classification>IP_ALL_PACKETS</CIG:Classification>
    <!--Actions to be applied-->
    <CIG:Action type="load-balance">server-ig1</CIG:Action>
    <CIG:Action type="load-balance">server-ig2</CIG:Action>
    </CIG:TrafficClass>
    <!--ARP traffic class-->
    <CIG:TrafficClass name="server-arp">
    <CIG:Classification>ETH_ARP_PACKETS</CIG:Classification>
    <!--Actions to be applied-->
    <CIG:Action type="pass-thru"/>
    </CIG:TrafficClass>
    <!--IPv6 traffic class-->
    <CIG:TrafficClass name="server-IPv6">
    <CIG:Classification>IPV6_ALL_PACKETS</CIG:Classification>
    <!--Actions to be applied-->
    <CIG:Action type="pass-thru"/>
    </CIG:TrafficClass>
    <!--Catch all traffic class-->
    <CIG:TrafficClass name="server-other">
    <CIG:Classification>ALL_PACKETS</CIG:Classification>
    <!--Actions to be applied-->
    <CIG:Action type="drop"/>
    </CIG:TrafficClass>
    </CIG:TrafficSet>
</CIG:Configuration>
```

Figure 9:
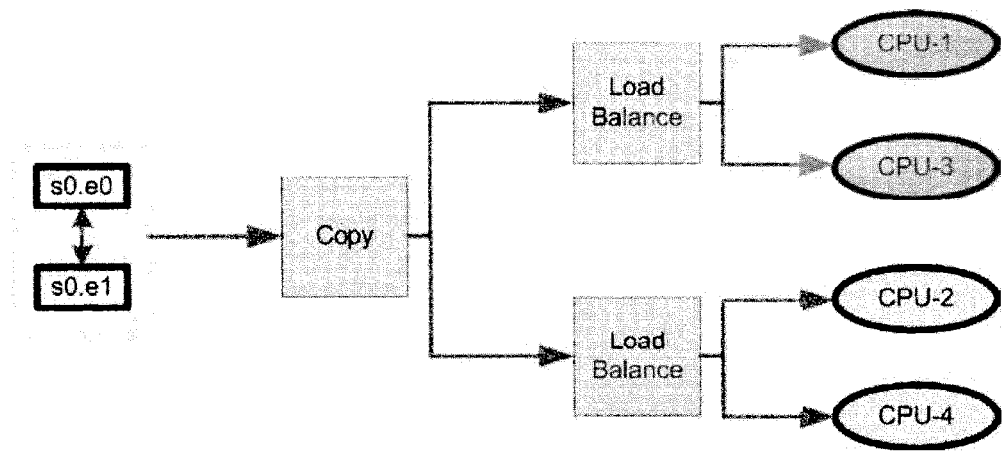

FIG. 9 illustrates an example of how device 102 can be configured to perform tapping with copying and load balancing for certain network traffic. This example is similar to the one above, however instead of one application operating in inline mode; both applications would be operating in tap mode while packets are passed directly through the system. Below is an XML file that device 102 can use to implement this example:

```
<?xml version="1.0"?>
<CIG:Configuration desc="Example #6: Tapping with Copying and Load Balancing">
    <!--Interface Configuration-->
    <CIG:InterfaceConfig>
        <CIG:Interface name="s0.e0" type="transparent">s0.e1</CIG:Interface>
        <CIG:Interface name="s0.e1" type="transparent">s0.e0</CIG:Interface>
    </CIG:InterfaceConfig>
    <!--Inspection Groups (CPUS)-->
    <!--first lab net inspection group-->
    <CIG:InspectionGroup name="lab-ig1">
    <CIG:Cpus from="apc">2</CIG:Cpus>
    </CIG:InspectionGroup>
    <!--second lab net inspection group-->
    <CIG:InspectionGroup name="lab-ig2">
    <CIG:Cpus from="apc">2</CIG:Cpus>
    </CIG:InspectionGroup>
    <!--Traffic Sets—describes how to handle traffic-->
    <!--Traffic Set for lab net interfaces-->
    <CIG:TrafficSet name="lab">
    <CIG:Input>
    <!--Interface(s) assigned to this Set-->
    <CIG:Interface>s0.e0</CIG:Interface>
    <CIG:Interface>s0.e1</CIG:Interface>
    </CIG:Input>
    <!--IP traffic class-->
```

```xml
<CIG:TrafficClass name="lab-ip">
<CIG:Classification>IP_ALL_PACKETS</CIG:Classification>
<!--Actions to be applied-->
<CIG:Action type="pass-thru"/>
<CIG:Action type="load-balance">lab-ig1</CIG:Action>
<CIG:Action type="load-balance">lab-ig2</CIG:Action>
</CIG:TrafficClass>
<!--Errored packets traffic class-->
<CIG:TrafficClass name="lab-errors">
<CIG:Classification>ERR_ALL_PACKETS</CIG:Classification>
<!--Actions to be applied-->
<CIG:Action type="drop"/>
</CIG:TrafficClass>
<!--Catch all traffic class-->
<CIG:TrafficClass name="lab-other">
<CIG:Classification>ALL_PACKETS</CIG:Classification>
<!--Actions to be applied-->
<CIG:Action type="pass-thru"/>
</CIG:TrafficClass>
</CIG:TrafficSet>
</CIG:Configuration>
```

Figure 10:
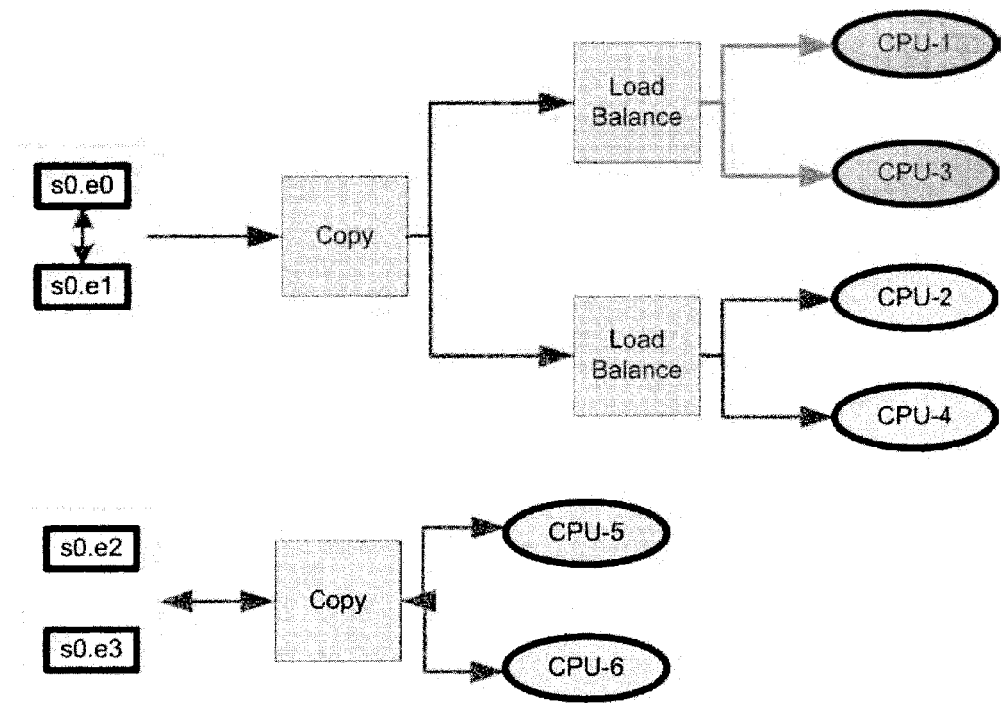

FIG. 10 illustrates an example of how device 102 can be configured to handle multiple traffic sets. More particularly, this shows an example of how multiple inspection groups can be configured inside of the same configuration file. Based on the XML configuration file below, the first application receiving packets from s0.e0 and s0.e1 would be configured for CPU list bvcig.lab-ig1 while the second application requiring copies of the packets would be configured for CPU list bvcig.lab-ig2. For packets coming in and out of s0.e2 and s0.e3, the application which would inline the packets could be configured for CPU list bvcig.mfg-ig. Below is an XML file that can be used by device 102 to implement this example:

```xml
<?xml version="1.0"?>
<CIG:Configuration desc="Example #7: Multiple Traffic Sets">
<!--Interface Configuration-->
<CIG:InterfaceConfig>
<!--For Traffic Set 'lab'-->
<CIG:Interface name="s0.e0" type="transparent">s0.e1</CIG:Interface>
<CIG:Interface name="s0.e1" type="transparent">s0.e0</CIG:Interface>
<!--For Traffic Set 'mfg'-->
<CIG:Interface name="s0.e2" type="transparent">s0.e3</CIG:Interface>
<CIG:Interface name="s0.e3" type="transparent">s0.e2</CIG:Interface>
</CIG:InterfaceConfig>
<!--Inspection Groups (CPUS)-->
<!--First inspection group for lab net-->
<CIG:InspectionGroup name="lab-ig1">
<CIG:Cpus from="apc" failstate="open">2</CIG:Cpus>
</CIG:InspectionGroup>
<!--Second inspection group for lab net-->
<CIG:InspectionGroup name="lab-ig2">
<CIG:Cpus from="apc" failstate="closed">2</CIG:Cpus>
</CIG:InspectionGroup>
<!--mfg net inspection group-->
<CIG:InspectionGroup name="mfg-ig">
<CIG:Cpus from="apc" failstate="redistribute">2</CIG:Cpus>
<CIG:Require failstate="open">2</CIG:Require>
</CIG:InspectionGroup>
<!--Traffic Sets—describes how to handle traffic-->
<!--Traffic Set for lab interfaces-->
<CIG:TrafficSet name="lab">
<CIG:Input>
<!--Interface(s) this rule set is assigned to-->
<CIG:Interface>s0.e0</CIG:Interface>
<CIG:Interface>s0.e1</CIG:Interface>
</CIG:Input>
<!--IP traffic class-->
<CIG:TrafficClass name="lab-ip">
<CIG:Classification>IP_ALL_PACKETS</CIG:Classification>
<!--Actions to be applied-->
<CIG:Action type="pass-thru"/>
<CIG:Action type="load-balance">lab-ig1</CIG:Action>
<CIG:Action type="load-balance">lab-ig2</CIG:Action>
</CIG:TrafficClass>
<!--Errored packets traffic class-->
<CIG:TrafficClass name="lab-errors">
<CIG:Classification>ERR_ALL_PACKETS</CIG:Classification>
<!--Actions to be applied-->
<CIG:Action type="drop"/>
</CIG:TrafficClass>
<!--Catch all traffic class-->
<CIG:TrafficClass name="lab-other">
<CIG:Classification>ALL_PACKETS</CIG:Classification>
<!--Actions to be applied-->
<CIG:Action type="pass-thru"/>
</CIG:TrafficClass>
</CIG:TrafficSet>
<!--Traffic Set for mfg interfaces-->
<CIG:TrafficSet name="mfg">
<CIG:Input>
<!--Interface(s) this rule set is assigned to-->
<CIG:Interface>s0.e2</CIG:Interface>
<CIG:Interface>s0.e3</CIG:Interface>
</CIG:Input>
<!--IP traffic class-->
<CIG:TrafficClass name="mfg-ip">
<CIG:Classification>IP_ALL_PACKETS</CIG:Classification>
<!--Actions to be applied-->
<CIG:Action type="broadcast">mfg-ig</CIG:Action>
</CIG:TrafficClass>
<!--ARP traffic class-->
<CIG:TrafficClass name="mfg-arp">
<CIG:Classification>ETH_ARP_PACKETS</CIG:Classification>
<!--Actions to be applied-->
<CIG:Action type="pass-thru"/>
</CIG:TrafficClass>
<!--IPv6 traffic class-->
<CIG:TrafficClass name="mfg-IPv6">
<CIG:Classification>IPV6_ALL_PACKETS</CIG:Classification>
<!--Actions to be applied-->
<CIG:Action type="pass-thru"/>
</CIG:TrafficClass>
<!--Catch all traffic class-->
```

```xml
<CIG:TrafficClass name="mfg-other">
<CIG:Classification>ALL_PACKETS</CIG:Classification>
<!--Actions to be applied-->
<CIG:Action type="drop"/>
</CIG:TrafficClass>
</CIG:TrafficSet>
</CIG:Configuration>
```

Figure 11:
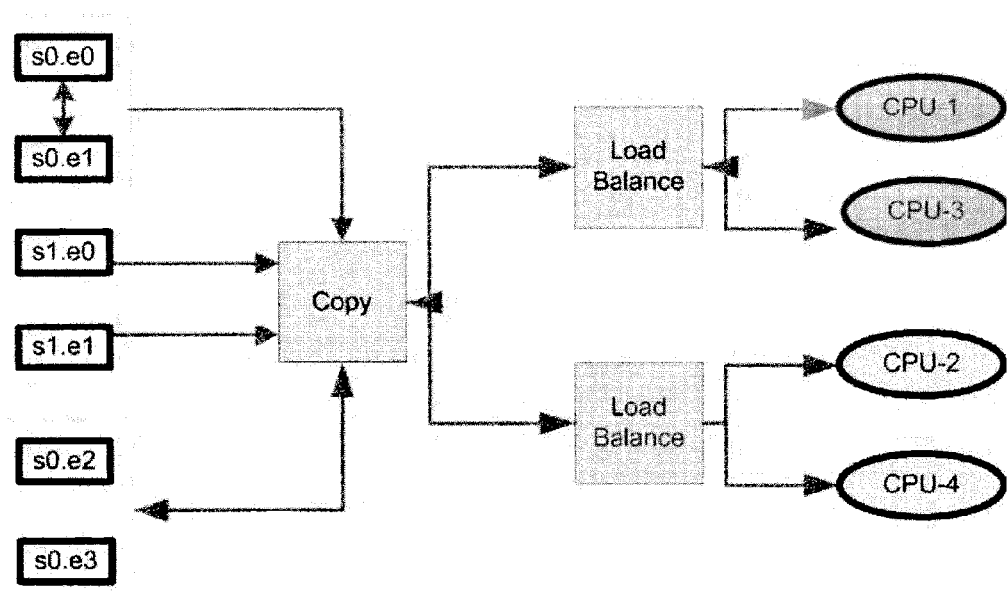

FIG. 11 illustrates an example of how device 102 can be configured with multiple interfaces using the same inspection groups. More particularly, this example shows sending copies of packets coming from several different interfaces to two different load balancing groups. This would allow two separate apps requiring more then one CPU to process the same traffic. In this particular example, the application on CPU-1 and CPU-3 would be transmitting the packets back out in an inline fashion for packets coming in interfaces s0.e2 and s0.e3, while the application on CPU-2 and CPU-4 would be operating in tap mode only. Packets coming in the other interfaces would be treated as taping only within both applications. Based on the XML configuration below, the first application requiring a copy of the traffic which will forward it on, could be configured for CPU list bvcig.foobar-ig1 while the second application which will just be taping the packets would be configured for the CPU list bvcig.foobar-ig2. Below is an XML file that can be used by device 102 to implement this example:

```xml
<?xml version="1.0"?>
<CIG:Configuration desc="Example #8: Multiple Interfaces using same ins groups">
<!--Interface Configuration-->
<CIG:InterfaceConfig>
<!--Interfaces for traffic set 'foo'-->
<CIG:Interface name="s0.e0" type="transparent">s0.e1</CIG:Interface>
<CIG:Interface name="s0.e1" type="transparent">s0.e0</CIG:Interface>
<!--Interfaces for traffic set 'bar'-->
<CIG:Interface name="s0.e2" type="transparent">s0.e3</CIG:Interface>
<CIG:Interface name="s0.e3" type="transparent">s0.e2</CIG:Interface>
<CIG:Interface name="s1.e0" type="transparent"/>
<CIG:Interface name="s1.e1" type="transparent"/>
</CIG:InterfaceConfig>
<!--Inspection Groups (CPUS)-->
<!--first foo net inspection group-->
<CIG:InspectionGroup name="foobar-ig1">
<CIG:Cpus from="apc">2</CIG:Cpus>
</CIG:InspectionGroup>
<!--second foo net inspection group-->
<CIG:InspectionGroup name="foobar-ig2">
<CIG:Cpus from="apc">2</CIG:Cpus>
</CIG:InspectionGroup>
<!--Traffic Sets—describes how to handle traffic-->
<!--Traffic Set for foo net interfaces-->
<CIG:TrafficSet name="foo">
<CIG:Input>
<!--Interface(s) assigned to this Set-->
<CIG:Interface>s0.e0</CIG:Interface>
<CIG:Interface>s0.e1</CIG:Interface>
</CIG:Input>
<!--IP traffic class-->
<CIG:TrafficClass name="foo-ip">
<CIG:Classification>IP_ALL_PACKETS</CIG:Classification>
<!--Actions to be applied-->
<CIG:Action type="pass-thru"/>
<CIG:Action type="load-balance">foobar-ig1</CIG:Action>
<CIG:Action type="load-balance">foobar-ig2</CIG:Action>
</CIG:TrafficClass>
<!--Errored packets traffic class-->
<CIG:TrafficClass name="foo-errors">
<CIG:Classification>ERR ALL_PACKETS</CIG:Classification>
<!--Actions to be applied-->
<CIG:Action type="drop"/>
</CIG:TrafficClass>
<!--Catch all traffic class-->
<CIG:TrafficClass name="foo-other">
<CIG:Classification>ALL_PACKETS</CIG:Classification>
<!--Actions to be applied-->
<CIG:Action type="pass-thru"/>
</CIG:TrafficClass>
</CIG:TrafficSet>
<!--Traffic Set for bar net interfaces-->
<CIG:TrafficSet name="bar">
<CIG:Input>
<!--Interface(s) assigned to this Set-->
<CIG:Interface>s0.e2</CIG:Interface>
<CIG:Interface>s0.e3</CIG:Interface>
<CIG:Interface>s1.e0</CIG:Interface>
<CIG:Interface>s1.e1</CIG:Interface>
</CIG:Input>
<!--IP traffic class-->
<CIG:TrafficClass name="bar-ip">
<CIG:Classification>IP_ALL_PACKETS</CIG:Classification>
<!--Actions to be applied-->
<CIG:Action type="load-balance">foobar-ig1</CIG:Action>
<CIG:Action type="load-balance">foobar-ig2</CIG:Action>
</CIG:TrafficClass>
<!--ARP traffic class-->
<CIG:TrafficClass name="bar-arp">
<CIG:Classification>ETH_ARP_PACKETS</CIG:Classification>
<!--Actions to be applied-->
<CIG:Action type="pass-thru"/>
</CIG:TrafficClass>
<!--IPv6 traffic class-->
<CIG:TrafficClass name="bar-IPv6">
<CIG:Classification>IPV6_ALL_PACKETS</CIG:Classification>
<!--Actions to be applied-->
<CIG:Action type="pass-thru"/>
</CIG:TrafficClass>
<!--Catch all traffic class-->
<CIG:TrafficClass name="bar-other">
<CIG:Classification>ALL_PACKETS</CIG:Classification>
<!--Actions to be applied-->
<CIG:Action type="drop"/>
</CIG:TrafficClass>
</CIG:TrafficSet>
</CIG:Configuration>
```

Figure 12:
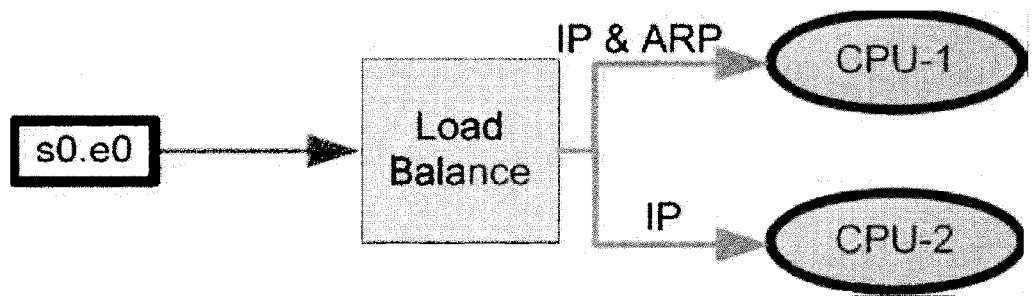

FIG. 12 illustrates an example of how device 102 can be configured to load balance IP with ARP from certain interface(s) to one CPU. More particularly, this example shows IP traffic being load shared to two different CPUs, while ARP traffic is sent to only one of those CPUs. Based on the XML configuration below, an application which must run on both CPUs to handle the IP traffic can be configured to run on CPU list bvcig.red-ig, while the application which must handle the ARP traffic could be configured to run on CPU list bvcig.red-ig.arp. Below is an XML file that can be used by device 102 to implement this example:

```
<?xml version="1.0"?>
<CIG:Configuration desc="Example #9: Load Balance IP
    with ARP to one CPU">
<!--Interface Configuration-->
<CIG:InterfaceConfig>
<CIG:Interface name="s0.e0" type="transparent"/>
</CIG:InterfaceConfig>
<!--Inspection Groups (CPUS)-->
<!--red net inspection group-->
<CIG:InspectionGroup name="red-ig">
<CIG:Cpus from="apc">2</CIG:Cpus>
<CIG:Require failstate="open">1</CIG:Require>
<!--Create our sub group "red_ig.arp" to handle ARP-->
<CIG:InspectionGroup name="arp">
<CIG:Max>1</CIG:Max>
<CIG:Require failstate="open">1</CIG:Require>
</CIG:InspectionGroup>
</CIG:InspectionGroup>
<!--Traffic Sets—describes how to handle traffic-->
<!--Traffic Set for red net interfaces-->
<CIG:TrafficSet name="red">
<CIG:Input>
<!--Interface(s) assigned to this Set-->
<CIG:Interface>s0.e0</CIG:Interface>
</CIG:Input>
<!--IP traffic class-->
<CIG:TrafficClass name="red-ip">
<CIG:Classification>IP_ALL_PACKETS</CIG:Classification>
<!--Actions to be applied-->
<CIG:Action type="load-balance">red-ig</CIG:Action>
</CIG:TrafficClass>
<!--ARP traffic class-->
<CIG:TrafficClass name="red-arp">
<CIG:Classification>ETH_ARP_PACKETS</CIG:Classification>
<!--Actions to be applied-->
<CIG:Action type="broadcast">red-ig.arp</CIG:Action>
</CIG:TrafficClass>
<!--Catch all traffic class-->
<CIG:TrafficClass name="red-other">
<CIG:Classification>ALL_PACKETS</CIG:Classification>
<!--Actions to be applied-->
<CIG:Action type="drop"/>
</CIG:TrafficClass>
</CIG:TrafficSet>
</CIG:Configuration>
```

According to additional aspects of the invention, the above examples illustrate how the dynamic resource allocation of the co-pending applications can be leveraged and extended in new and useful ways. For example, as set forth in the co-pending applications, different network service applications can be dynamically loaded onto one or more of the same or different CPUs. The present invention leverages and extends these capabilities so as to allow the groups of CPUs on which particular applications are loaded to be dynamically configured, as well as the classes and amount of traffic they service. For example, a group of CPUs can be given a name such as red-ig, and certain network service applications can be assigned to be dynamically loaded on these CPUs as set forth in more detail in the co-pending applications. The present invention allows the interfaces and individual CPUs to be dynamically re-assigned by reference to the logical CIG name red-ig, for example, rather than the individual CPUs themselves, thus providing additional flexibility and performance. For example, the invention allows an administrator to specify a specific set of CPUs onto which certain applications are loaded, and further allows the administrator to identify this set of CPUs as a CIG, and to configure traffic sets and traffic classes such that a number of interfaces (such as those corresponding to a group within a company such as a Lab), and traffic classes on those interfaces (e.g. IP traffic) are serviced by the applications and CPUs specified in the CIG.

According to yet further aspects of the invention, additional advantages are obtained by leveraging the ability of the system described in U.S. Pat. No. 8,005,101 to dynamically scale the number of CPUs in the system according to needs. For example, where a specific set of applications (and corresponding CPUs) has been bound to a given traffic set and/or class, and where the group or network associated with that set (e.g. a group within a company such as a Lab) has grown by a significant number, another CPU/AP can be added to the system and easily assigned to that set of applications by adding it to the CIG and dynamically loading the same set of applications thereon.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
    defining one or more physical network interfaces of a programmable network service device as a first traffic set;
    defining another one or more physical network interfaces of the device as second traffic set;
    allowing an administrator to configure the first and second traffic sets, including:
        specifying a plurality of different classes of network traffic for both of the first and second traffic sets; and
        assigning actions to each of the specified classes of network traffic;
    receiving network traffic at the network interfaces of the device defined as the first and second traffic sets;
    identifying attributes of the received traffic;
    comparing the identified attributes to the specified classes;
    performing the assigned actions on the received traffic based on the comparison between the identified attributes and the specified classes;
    associating unique identifiers with each of a plurality of processors of the device;
    causing software corresponding to one or more the assigned actions to run on one of the processors,
    maintaining a configurable list for identifying network services associated with the plurality of processors; and
    allowing an administrator to dynamically edit the list, thereby dynamically changing how the traffic is serviced without changing any of the processors of the device.

2. A method according to claim 1, wherein the identified attributes include a network protocol.

3. A method according to claim 1, wherein the identified attributes include information from network Layers 4 through 7.

4. A method according to claim 1, wherein the identified attributes include deep-packet information.

5. A method according to claim 1, wherein the identified attributes include state or environmental conditions.

6. A method according to claim 1, wherein an action assigned to the specified classes by the administrator and performed in the performing step includes passing the traffic with the identified attributes through the device in addition to forwarding the traffic to processors within the device.

7. A method according to claim 1, wherein an action assigned to the specified classes by the administrator and performed in the performing step includes switching the received network traffic between the network interfaces of the device.

8. A method according to claim 1, wherein an action assigned to the specified classes by the administrator and performed in the performing step includes load balancing the traffic with the identified attributes among the processors of the device.

9. A method according to claim 1, wherein an action assigned to the specified classes by the administrator and performed in the performing step includes performing a network service on the traffic.

10. A method according to claim 1, wherein an action assigned to the specified classes by the administrator and performed in the performing step includes copying the traffic to first and second different processors of the device.

11. A method comprising:
defining one or more physical network interfaces of a programmable network service device as a traffic set;
allowing an administrator to configure the traffic set, including:
specifying a plurality of different classes of network traffic for the traffic set; and
assigning actions to each of the specified classes of network traffic;
receiving network traffic at the network interfaces of the device defined as the traffic set;
performing deep packet inspection on the received traffic to identify attributes of the traffic that is not available in header information of the traffic;
comparing the identified attributes to the specified classes;
performing the assigned actions on the received traffic based on the comparison between the identified attributes and the specified classes, wherein an action assigned to the specified classes by the administrator and performed in the performing step includes performing a network service on the traffic;
associating unique identifiers with each of a plurality of processors of the device;
causing software corresponding to the network service to run on one of the processors,
wherein assigning actions includes associating the identifier of the one processor with the specified class of traffic;
maintaining a configurable list for identifying network services associated with the plurality of processors; and
allowing an administrator to dynamically edit the list, thereby dynamically changing how the traffic is serviced without changing any of the processors of the device.

12. A method according to claim 11, wherein the identified attributes include information from network Layers 4 through 7.

13. A method according to claim 11, wherein an action assigned to the specified classes by the administrator and performed in the performing step includes passing the traffic with the identified attributes through the device in addition to forwarding the traffic to processors within the device.

14. A method according to claim 11, wherein an action assigned to the specified classes by the administrator and performed in the performing step includes switching the received network traffic between the network interfaces of the device.

15. A method according to claim 11, wherein an action assigned to the specified classes by the administrator and performed in the performing step includes load balancing the traffic with the identified attributes among the processors of the device.

16. A method according to claim 11, wherein an action assigned to the specified classes by the administrator and performed in the performing step includes copying the traffic to first and second different processors of the device.

17. A method comprising:
defining one or more physical network interfaces of a programmable network service device as a first traffic set;
defining another one or more physical network interfaces of the device as second traffic set, wherein each of the defined physical network interfaces is identified based on slot and port numbers;
allowing an administrator to configure the first and second traffic sets, including:
specifying a plurality of different classes of network traffic for both of the first and second traffic sets; and
assigning actions to each of the specified classes of network traffic;
receiving network traffic at the network interfaces of the device defined as the first and second traffic sets;
identifying attributes of the received traffic;
comparing the identified attributes to the specified classes; and
performing the assigned actions on the received traffic based on the comparison between the identified attributes and the specified classes.

18. A method according to claim 17, wherein the identified attributes include a network protocol.

19. A method according to claim 17, wherein the identified attributes include information from network Layers 4 through 7.

20. A method according to claim 17, wherein the identified attributes include information from payload contents outside of packet headers.

* * * * *